(12) United States Patent
Takanohashi et al.

(10) Patent No.: US 12,315,305 B2
(45) Date of Patent: May 27, 2025

(54) INFORMATION PROCESSING APPARATUS, METHOD, AND NON-TRANSITORY STORAGE MEDIUM THEREOF FOR CONTROLLING LIGHT SOURCE EMBEDDED IN PARKING LOT

(71) Applicant: TOYOTA JIDOSHA KABUSHIKI KAISHA, Toyota (JP)

(72) Inventors: Kodai Takanohashi, Okazaki (JP); Atsushi Okubo, Nisshin (JP); Yuji Tachibana, Nisshin (JP); Shogo Momoshima, Nagoya (JP); Takaaki Kato, Saitama (JP); Daiki Kaneichi, Tokyo (JP); Minoru Nakadori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 17/655,238

(22) Filed: Mar. 17, 2022

(65) Prior Publication Data
US 2022/0301355 A1    Sep. 22, 2022

(30) Foreign Application Priority Data
Mar. 17, 2021  (JP) ................. 2021-044035

(51) Int. Cl.
| G06Q 10/02 | (2012.01) |
| G06Q 30/0204 | (2023.01) |
| G07B 15/02 | (2011.01) |
| G08G 1/14 | (2006.01) |

(52) U.S. Cl.
CPC ............. *G07B 15/02* (2013.01); *G06Q 10/02* (2013.01); *G06Q 30/0205* (2013.01); *G08G 1/148* (2013.01)

(58) Field of Classification Search
CPC .... G07B 15/02; G06Q 10/02; G06Q 30/0205; G08G 1/148
See application file for complete search history.

(56) References Cited

U.S. PATENT DOCUMENTS

| 11,328,368 B1* | 5/2022 | Labrie ................. G06N 20/00 |
| 2015/0170517 A1* | 6/2015 | Yan ..................... G08G 1/146 340/932.2 |
| 2015/0279213 A1* | 10/2015 | Balter .................. G07B 15/02 705/13 |

(Continued)

FOREIGN PATENT DOCUMENTS

| JP | 2002288698 A | 10/2002 |
| JP | 2011095820 A | 5/2011 |

(Continued)

OTHER PUBLICATIONS

Sutherland, Lane, et. al., "Parking by Design", 2020, City and Regional Planning at Cal Poly (Year: 2020).*

*Primary Examiner* — Jeff Zimmerman
*Assistant Examiner* — Wayne S. Murray
(74) *Attorney, Agent, or Firm* — SoraIP, Inc.

(57) ABSTRACT

A control unit of an information processing apparatus determines, upon determining that a demand for parking in a parking lot is low based on a comparison between a score indicating the demand and a predetermined first threshold value, to set a first area to a parking prohibited state. The first area is at least a part of the parking lot.

19 Claims, 4 Drawing Sheets

(56) References Cited

U.S. PATENT DOCUMENTS

| | | | |
|---|---|---|---|
| 2017/0193491 A1* | 7/2017 | Phipps | H04W 4/80 |
| 2019/0266623 A1* | 8/2019 | Sakurada | G06N 5/04 |
| 2020/0126419 A1 | 4/2020 | Yasui et al. | |
| 2020/0258021 A1 | 8/2020 | Fujii et al. | |
| 2020/0311641 A1* | 10/2020 | Noguchi | G06V 20/586 |

FOREIGN PATENT DOCUMENTS

| | | |
|---|---|---|
| JP | 2020-074171 A | 5/2020 |
| JP | 2020-129349 A | 8/2020 |

* cited by examiner

INFORMATION PROCESSING APPARATUS, METHOD, AND NON-TRANSITORY STORAGE MEDIUM THEREOF FOR CONTROLLING LIGHT SOURCE EMBEDDED IN PARKING LOT

BACKGROUND

1. Technical Field

The present disclosure relates to an information processing apparatus, a method, and a non-transitory storage medium.

2. Description of Related Art

A technology that promotes the utilization of a parking lot is well-known. For example, Japanese Unexamined Patent Application Publication No. 2002-288698 discloses a technology that sets a parking fee high when the demand for a parking lot is high and sets the parking fee low when the demand for the parking lot is low.

SUMMARY

There is room for improvement in the technology that promotes the utilization of a parking lot.

The present disclosure provides a technology that promotes the utilization of a parking lot.

An information processing apparatus according to a first aspect of the present disclosure includes a control unit. The control unit is configured to, upon determining that a demand for parking in a parking lot is low based on a comparison between a score indicating the demand and a predetermined first threshold value, determine to set a first area to a parking prohibited state. The first area is at least a part of the parking lot.

In the first aspect, the control unit may output an instruction to move a vehicle positioned in the first area to a second area by autonomous driving or a dedicated vehicle. The second area may be not set to the parking prohibited state.

In the first aspect, the control unit may calculate a cost based on a total movement distance or working time when a vehicle positioned in the first area is moved to the second area that is not set to the parking prohibited state, and determine to set the first area to the parking prohibited state when the cost is lower than a predetermined second threshold value.

In the first aspect, the control unit may register, when an event is held in the first area, in advance a minimum size of an area required for each of candidate events to be held, acquire a popularity rank of each of the candidate events from a plurality of users, and select, based on the size registered in advance and the acquired popularity rank, the most popular event from among events that can be held in a size of the first area out of the candidate events.

In the first aspect, the control unit may acquire the number of expected participants for each of the candidate events and correct, based on the acquired number of expected participants, the size registered in advance.

In the first aspect, the control unit may register in advance one or more business owners for each of the candidate events and output a notification asking the business owners associated with the selected event to open booths.

In the first aspect, when an event is held in the first area, the event includes a flea market, and the control unit may select, based on goods provision information of each of users in an application or a service that enables the users to buy and sell goods between the users via the Internet, a goods provision candidate for the flea market.

A method according to a second aspect of the present disclosure is executed by an information processing apparatus. The method includes determining, upon determining that a demand for parking in a parking lot is low based on a comparison between a score indicating the demand and a predetermined first threshold value, to set a first area to a parking prohibited state. The first area is at least a part of the parking lot.

In the second aspect, the method may further include outputting an instruction to move a vehicle positioned in the first area to a second area by autonomous driving or a dedicated vehicle. The second area may be not set to the parking prohibited state.

In the second aspect, the method may further include calculating a cost based on a total movement distance or working time when a vehicle positioned in the first area is moved to a second area that is not set to the parking prohibited state. The first area may be determined to be set to the parking prohibited state when the cost is lower than a predetermined second threshold value.

In the second aspect, the method may further include registering, when an event is held in the first area, in advance a minimum size of an area required for each of candidate events to be held, acquiring a popularity rank of each of the candidate events from a plurality of users, and selecting, based on the minimum size registered in advance and the acquired popularity rank, the most popular event from among events that can be held in a size of the first area out of the candidate events.

In the second aspect, the method may further include acquiring the number of expected participants for each of the candidate events and correcting, based on the acquired number of expected participants, the minimum size registered in advance.

In the second aspect, the method may further include registering in advance one or more business owners for each of the candidate events and outputting a notification asking the business owners associated with the selected event to open booths.

In the second aspect, when an event is held in the first area, the event may include a flea market. The method may further include selecting, based on goods provision information of each of the users in an application or a service that enables the users to buy and sell goods between the users via the Internet, a goods provision candidate for the flea market.

A non-transitory storage medium according to a third aspect of the present disclosure stores a command to cause a computer to execute functions. The functions include determining, upon determining that a demand for parking in a parking lot is low based on a comparison between a score indicating the demand and a predetermined first threshold value, to set a first area to a parking prohibited state. The first area is at least a part of the parking lot.

In the third aspect, the functions may further include outputting an instruction to move a vehicle positioned in the first area to a second area by autonomous driving or a dedicated vehicle. The second area may be not set to the parking prohibited state.

In the third aspect, the functions may further include calculating a cost based on a total movement distance or working time when a vehicle positioned in the first area is moved to a second area that is not set to the parking prohibited state. The first area may be determined to be set to the parking prohibited state when the cost is lower than a predetermined second threshold value.

In the third aspect, the functions may further include registering, when an event is held in the first area, in advance a minimum size of an area required for each of candidate events to be held, acquiring a popularity rank of each of the candidate events from a plurality of users, and selecting, based on the size registered in advance and the acquired popularity rank, the most popular event from among events that can be held in a size of the first area out of candidate events.

In the third aspect, the functions may further include registering in advance one or more business owners for each of the candidate events and outputting a notification asking the business owners associated with the selected event to open booths.

In the third aspect, when an event is held in the first area, the event may include a flea market. The functions may further include selecting, based on goods provision information of each of users in an application or a service that enables the users to buy and sell goods between the users via the Internet, a goods provision candidate for the flea market.

With each aspect of the present disclosure, the technology that promotes the utilization of a parking lot is improved.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, an embodiment of the present disclosure will be described.

Overview of Embodiment

Figure 1:
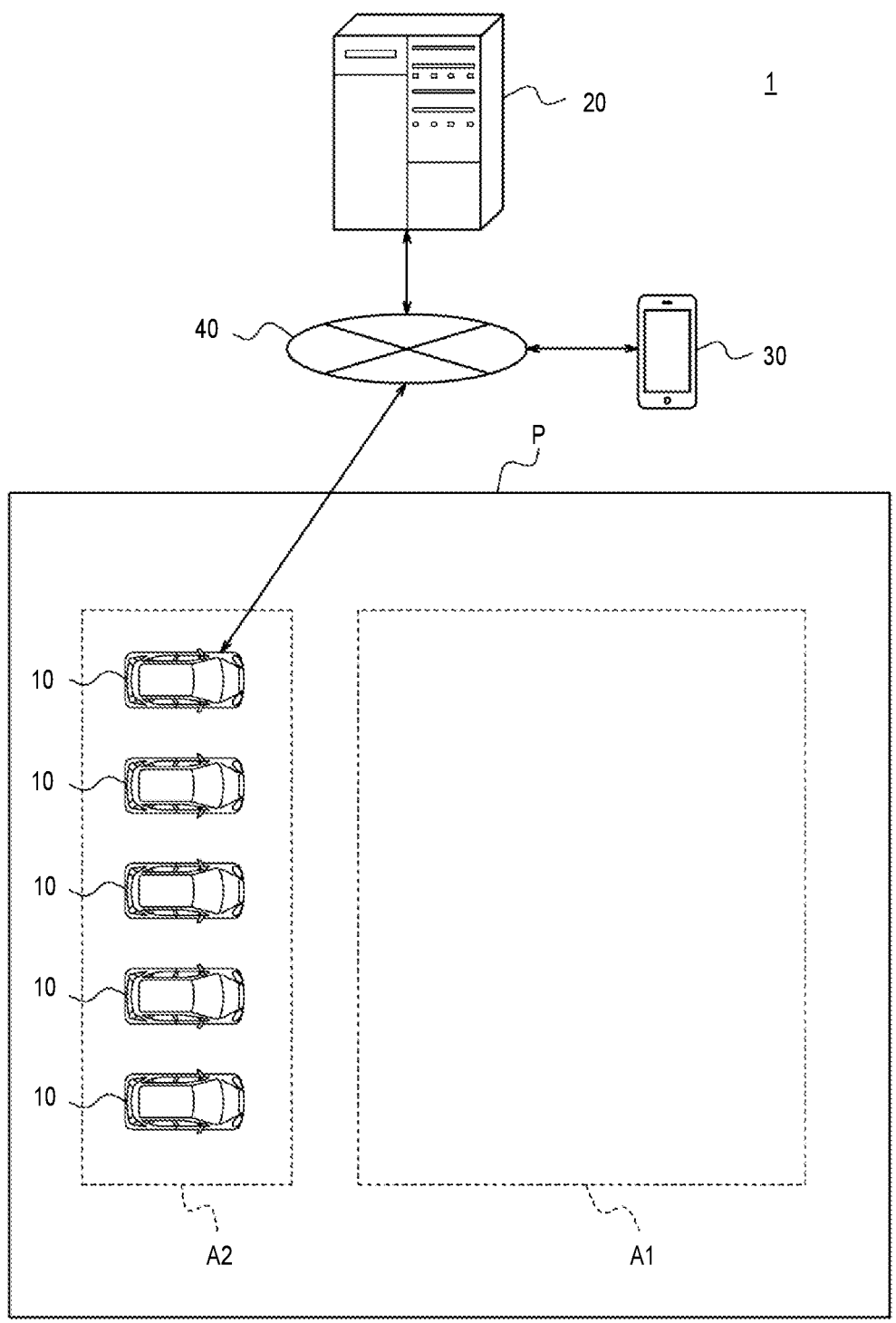
FIG. 1 is a block diagram illustrating a schematic configuration of a system according to one embodiment.

An overview of a system 1 according to an embodiment of the present disclosure will be described with reference to FIG. 1. The system 1 includes one or more vehicles 10, an information processing apparatus 20, and a terminal 30. The vehicle 10 is communicably connected to each of the information processing apparatus 20 and the terminal 30 via, for example, a network 40 including the Internet and a mobile communication network.

The vehicle 10 may be, for example, an automobile, but is not limited thereto and may be any vehicle. Examples of the automobile include a gasoline-powered vehicle, an electric vehicle (EV), a hybrid vehicle (HV), a plug-in hybrid vehicle (PHV), or a fuel cell vehicle (FCV), but are not limited thereto. The vehicle 10 may be driven by a driver or driven at any level of automation. The level of automation may be, for example, one of Level 1 to Level 5 classified by the Society of Automotive Engineers (SAE) leveling. The vehicle 10 may be a vehicle dedicated to Mobility-as-a-Service (MaaS). The number of vehicles 10 may be arbitrarily determined.

The information processing apparatus 20 is a computer, such as a server device. The information processing apparatus 20 can communicate with the vehicle 10 and the terminal 30 via the network 40.

The terminal 30 is a general-purpose electronic device, such as a smartphone, a tablet, or a personal computer (PC).

First, the overview of the present embodiment will be described and details will be described below. Upon determining that a demand for parking in a parking lot P is low based on a comparison between a score indicating the demand for parking in the parking lot P and a predetermined first threshold value, the control unit 21 of the information processing apparatus 20 determines to set a first area A1 which is at least a part of the parking lot P to a parking prohibited state.

With the present embodiment, when the demand for parking in the parking lot P is low, the first area A1 which is at least a part of the parking lot P is set to the parking prohibited state. For this reason, it is possible to utilize the first area A1 as an event venue or the like. Therefore, the technology that promotes the utilization of the parking lot P is improved.

Next, each configuration of the system 1 will be described in detail.

Configuration of Vehicle

Figure 2:
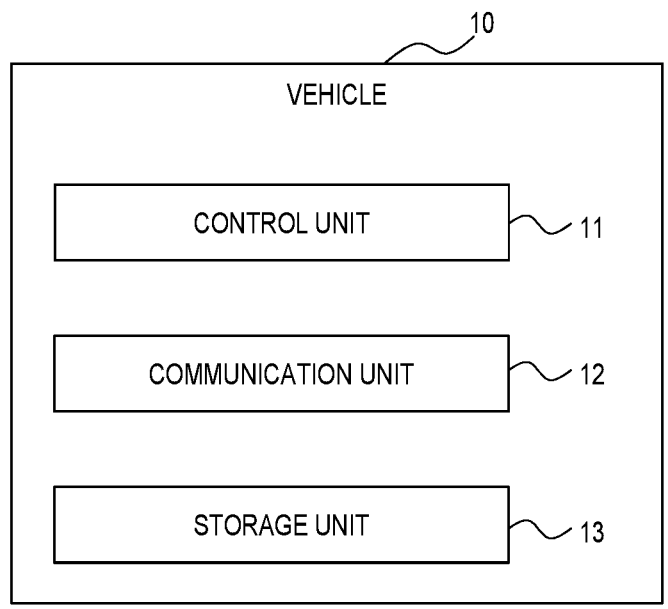
FIG. 2 is a block diagram illustrating a schematic configuration of a vehicle according to one embodiment.

As illustrated in FIG. 2, the vehicle 10 includes a control unit 11, a communication unit 12, and a storage unit 13.

The control unit 11 includes one or more processors, one or more programmable circuits, one or more dedicated circuits, or a combination thereof. Examples of the processor include a general-purpose processor, such as a central processing unit (CPU) or a graphics processing unit (GPU), or a dedicated processor specialized for a specific process, but are not limited thereto. Examples of the programmable circuit include a field-programmable gate array (FPGA), but are not limited thereto. Examples of the dedicated circuit include an application-specific integrated circuit (ASIC), but are not limited thereto. The control unit 11 controls an operation of the entire vehicle 10.

The communication unit 12 includes one or more communication interfaces connected to the network 40. The communication interface corresponds to, for example, a mobile communication standard, such as Fourth Generation (4G) or Fifth Generation (5G), but is not limited thereto. In the present embodiment, the vehicle 10 communicates with the information processing apparatus 20 via the communication unit 12 and the network 40.

The storage unit 13 includes one or more memories. Examples of the memory include a semiconductor memory, a magnetic memory, or an optical memory, but are not limited thereto. Each memory included in the storage unit 13 may function as, for example, a primary storage device, a secondary storage device, or a cache memory. The storage unit 13 stores any information used for the operation of the vehicle 10. For example, the storage unit 13 may store a system program, an application program, embedded software, and the like. The information stored in the storage unit 13 may be updated with information acquired from the network 40 via, for example, the communication unit 12.

Configuration of Information Processing Apparatus

Figure 3:
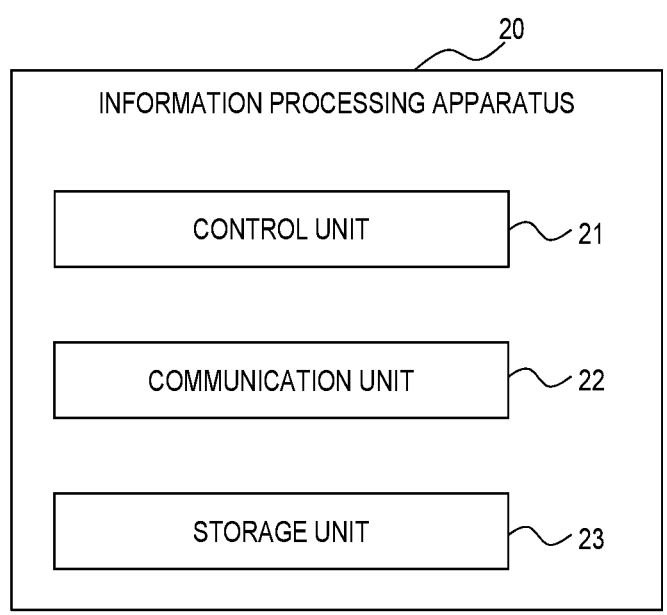
FIG. 3 is a block diagram illustrating a schematic configuration of an information processing apparatus according to one embodiment.

As illustrated in FIG. 3, the information processing apparatus 20 includes a control unit 21, a communication unit 22, and a storage unit 23.

The control unit 21 includes one or more processors, one or more programmable circuits, one or more dedicated circuits, or a combination thereof. The control unit 21 controls an operation of the entire information processing apparatus 20.

The communication unit 22 includes one or more communication interfaces connected to the network 40. The communication interface corresponds to, for example, a mobile communication standard, a wired local area network (LAN) standard, or a wireless LAN standard, but is not limited thereto and may correspond to any communication standard. In the present embodiment, the information processing apparatus 20 communicates with the vehicle 10 and the terminal 30 via the communication unit 22 and the network 40.

The storage unit 23 includes one or more memories. Each memory included in the storage unit 23 may function as, for example, a primary storage device, a secondary storage device, or a cache memory. The storage unit 23 stores any information used for the operation of the information processing apparatus 20. For example, the storage unit 23 may store a system program, an application program, a database, map information, and the like. The information stored in the storage unit 23 may be updated with information acquired from the network 40 via, for example, the communication unit 22.

Configuration of Terminal

Figure 4:
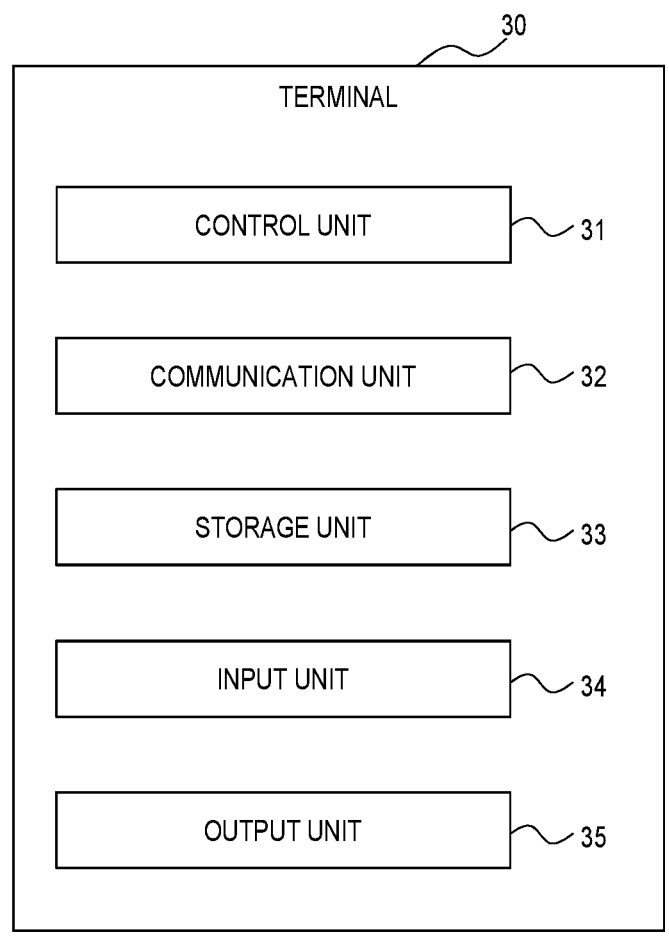
FIG. 4 is a block diagram illustrating a schematic configuration of a terminal according to one embodiment.

As illustrated in FIG. 4, the terminal 30 includes a control unit 31, a communication unit 32, a storage unit 33, an input unit 34, and an output unit 35.

The control unit 31 includes one or more processors, one or more programmable circuits, one or more dedicated circuits, or a combination thereof. The control unit 31 controls an operation of the entire terminal 30.

The communication unit 32 includes one or more communication interfaces connected to the network 40. The communication interface corresponds to, for example, Bluetooth® Low Energy (BLE), Radio Frequency Identification (RFID), LAN, Long-Term Evolution (LTE), 4G, or 5G, but is not limited thereto and may correspond to any communication standard. In the present embodiment, the terminal 30 communicates with the information processing apparatus 20 via the communication unit 32 and the network 40.

The storage unit 33 includes one or more memories. Each memory included in the storage unit 33 may function as, for example, a primary storage device, a secondary storage device, or a cache memory. The storage unit 33 stores any information used for the operation of the terminal 30. For example, the storage unit 33 may store a system program, an application program, a database, map information, and the like. The information stored in the storage unit 33 may be updated with information acquired from the network 40 via, for example, the communication unit 32.

The input unit 34 is one or more input interfaces. As the input interface, for example, a physical key, a capacitance key, a pointing device, a touch screen provided integrally with a display, or a microphone can be used. The input unit 34 accepts an operation, such as a user's input of information used for the operation of the terminal 30.

The output unit 35 is one or more output interfaces. As the output interface, for example, a display or a speaker can be used. As the display, for example, a liquid crystal display (LCD) or an organic electro-luminescence (EL) display can be used. The output unit 35 outputs information obtained by the operation of the terminal 30 to the user.

Operation Flow of Information Processing Apparatus

Figure 5:
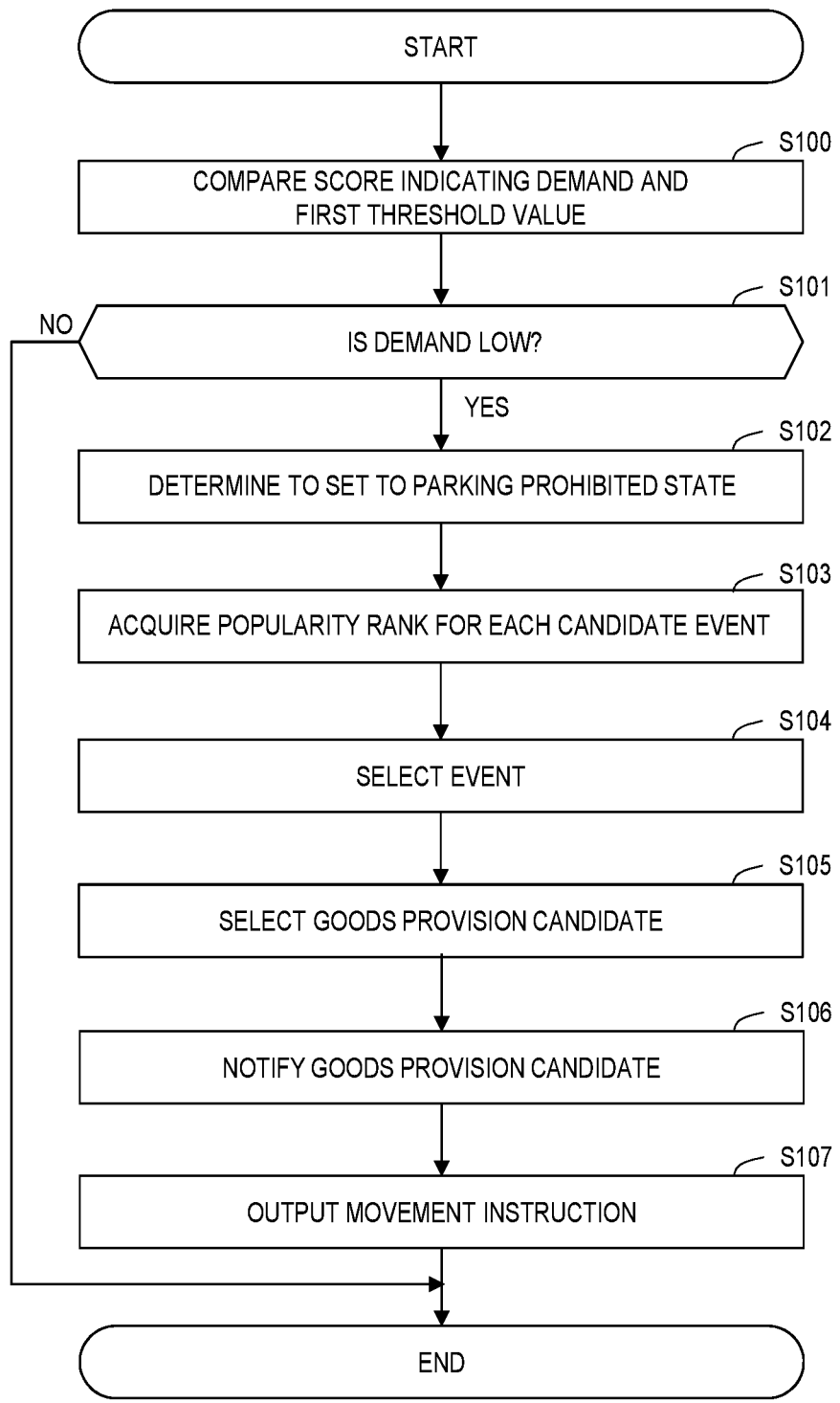
FIG. 5 is a flowchart illustrating an operation of the information processing apparatus.

The operation of the information processing apparatus 20 according to the present embodiment will be described with reference to FIG. 5. This operation corresponds to a method according to the present embodiment.

Step S100: The control unit 21 of the information processing apparatus 20 compares a score indicating the demand for parking in the parking lot P with the predetermined first threshold value.

Here, the control unit 21 of the information processing apparatus 20 may calculate the score indicating the demand for parking based on a utilization rate of the parking lot P. For example, the score indicating the demand for parking may be a future utilization rate of the parking lot P (for example, a continuous value of 0 to 1 or 0% to 100%), which is estimated by the control unit 21 based on the utilization rate of the parking lot P from the past to the present. Alternatively, the score indicating the demand for parking may be a stepwise indicator, such as "high, medium, low", which is acquired by discretizing the future utilization rate of the parking lot P by the control unit 21. Here, the utilization rate of the parking lot P may be a ratio of an actual number of parked vehicles to the maximum number of vehicles 10 that can be accommodated in the parking lot P. Further, the future may be a date and time of an event or the like to be held at the parking lot P. The predetermined first threshold value may be appropriately set in consideration of the average utilization rate of the parking lot P and the like.

Step S101: The control unit 21 of the information processing apparatus 20 determines whether the demand for parking in the parking lot P is low based on the comparison in step S100. When the control unit 21 determines that the demand for parking in the parking lot P is low (step S101: Yes), the process proceeds to step S102. On the other hand, when the control unit 21 determines that the demand for parking in the parking lot P is not low (step S101: No), the process ends.

Specifically, upon determining that the score indicating the demand for parking in the parking lot P is lower than the predetermined first threshold value, the control unit 21 of the information processing apparatus 20 determines that the demand for parking in the parking lot P is low.

Step S102: The control unit 21 of the information processing apparatus 20 determines to set the first area A1 which is at least a part of the parking lot P to the parking prohibited state.

In this example, it is assumed that the event is held in the first area A1. Based on the determination in step S102, the control unit 21 of the information processing apparatus 20 sets the first area A1 to the parking prohibited state on the date and time of the event to be held in the first area A1. As such, the parking lot P includes the first area A1, which is set to the parking prohibited state, and a second area A2, which is not set to the parking prohibited state (hereinafter, also referred to as a "parking permitted state"). The control unit 21 may set the first area A1 to the parking prohibited state by controlling light emission of a light source, such as a light-emitting diode (LED) lighting, embedded in a road surface of the parking lot P and by displaying the first area A1 and the second area A2 on the road surface of the parking lot P in a manner in which they are distinguishable. The number of first areas A1 and second areas A2 may be arbitrarily determined. After a predetermined time has elapsed after setting the first area A1 to the parking prohibited state, the control unit 21 may set the first area A1 from the parking prohibited state to the parking permitted state. The predetermined time may be appropriately set in consideration of, for example, an end time of an event or the like to be held in the first area A1.

Before step S102, the control unit 21 of the information processing apparatus 20 may calculate a cost based on a total movement distance or working time when the vehicle 10 positioned in the first area A1 is moved to the second area A2. Then, when the demand for parking in the parking lot P is low and the cost is lower than a predetermined second threshold value, the control unit 21 may determine to set the first area A1 which is at least a part of the parking lot P to the parking prohibited state. The predetermined second threshold value may be appropriately set in consideration of a profit and the like expected from the event to be held in the first area A1.

Hereinafter, in this example, it is assumed that a gourmet food festival, a live concert, and a flea market are registered in advance in the storage unit 23 of the information processing apparatus 20 as a plurality of candidate events to be held in the first area A1. Further, it is assumed that the minimum size of an area required to hold a gourmet food festival, the minimum size of an area required to hold a live concert, and the minimum size of an area required to hold a flea market are registered in the storage unit 23. Specifically, it is assumed that the size of the first area A1 is 800 m$^2$, and the minimum size of an area required to hold a gourmet food festival is 1000 m$^2$, the minimum size of an area required to hold a live concert is 700 m$^2$, and the minimum size of an area required to hold a flea market is 600 m$^2$.

Step S103: The control unit 21 of the information processing apparatus 20 acquires a popularity rank of each candidate event from a plurality of users.

Specifically, the control unit 21 of the information processing apparatus 20 acquires a popularity rank of each candidate event from the users based on the users' answers to a questionnaire in which a plurality of candidate events are prepared as options. More specifically, the control unit 21 of the information processing apparatus 20 transmits the questionnaire to a terminal 30 of each user via the communication unit 22. Then, the control unit 31 of the terminal 30 receives the questionnaire from the information processing apparatus 20 via the communication unit 32. Then, the control unit 31 of the terminal 30 outputs the questionnaire to the user by display or voice via the output unit 35. Then, the control unit 31 of the terminal 30 accepts an operation of the user's answer to the questionnaire via the input unit 34. Then, the control unit 31 of the terminal 30 transmits the answer to the questionnaire to the information processing apparatus 20 via the communication unit 32. In this example, it is assumed that a gourmet food festival, a flea market, and a live concert are prepared in advance as questionnaire options. Further, in this example, it is assumed that a popularity rank of each candidate event acquired in this manner is that the gourmet food festival is ranked first, the flea market is ranked second, and the live concert is ranked third. The users can include, for example, residents of smart cities, but are not limited thereto.

In step S103, the control unit 21 of the information processing apparatus 20 may acquire a popularity rank of each candidate event from the users based on a search query that is input to a search engine used in each terminal 30. Alternatively, the control unit 21 may acquire a popularity rank of each candidate event from the users based on the content of a message in a social networking service (SNS) used in each terminal 30.

Step S104: Based on the minimum size of the area required for each candidate event registered in advance and the popularity rank acquired in step S103, the control unit 21 of the information processing apparatus 20 selects the most popular event from among the events that can be held in the size of the first area A1 out of the candidate events.

In this example, as described above, the minimum size of the area required to hold the first-ranked gourmet food festival is 1000 m$^2$. However, since the size of the first area A1 is 800 m$^2$, the first-ranked gourmet food festival cannot be held in the size of the first area A1. On the other hand, the minimum size of the area required to hold the second-ranked flea market is 600 m$^2$, and the minimum size of the area required to hold the third-ranked live concert is 700 m$^2$. For this reason, the second-ranked flea market and the third-ranked live concert can be held in the size of the first area A1. Therefore, the control unit 21 of the information processing apparatus 20 selects the second-ranked flea market, which is the most popular event from among the second-ranked flea market and the third-ranked live concert that can be held in the size of the first area A1. As such, the user satisfaction is improved by also considering the popularity of the candidate events.

In step S104, before selecting the above-described event, the control unit 21 of the information processing apparatus 20 may acquire the number of expected participants for each candidate event. Then, before selecting the above-described event, the control unit 21 may correct the minimum size of the area required for each candidate event registered in advance based on the acquired number of expected participants. For example, when the number of expected participants in a candidate event deviates from a predetermined reference value, the control unit 21 may increase or decrease the minimum size of the area required for the candidate event according to the degree of deviation from the predetermined reference value. The number of expected participants may be the number of respondents who have selected each option of the above-described questionnaire, but is not limited thereto.

Step S105: The control unit 21 of the information processing apparatus 20 selects a goods provision candidate for the flea market based on goods provision information of each user in the application or the service that enables the users to buy and sell goods between them via the Internet.

In this example, it is assumed that the goods provision information of each user is registered in a database possessed by a business owner who runs the application or the service that enables the users to buy and sell goods between them via the Internet. The control unit 21 of the information processing apparatus 20 can acquire the goods provision information of each user via the communication unit 22 by referring to the database possessed by the business owner. The goods provision information of each user may include, for example, a frequency of providing goods or the number of provided goods by each user. In this case, the control unit 21 may select, as a goods provision candidate for the flea market, a user whose frequency of providing goods or the number of provided goods exceeds a predetermined third threshold value. The predetermined third threshold value may be appropriately set in consideration of the size of the first area A1 and the like.

Step S106: The control unit 21 of the information processing apparatus 20 transmits, to the goods provision candidate selected in step S105, via the communication unit 22, a notification indicating that he/she has been selected as the goods provision candidate for the flea market.

Specifically, the control unit 21 of the information processing apparatus 20 transmits, to a terminal 30 of the goods provision candidate selected in step S105, via the communication unit 22, the notification indicating that he/she has been selected as the goods provision candidate for the flea market. Then, the control unit 31 of the terminal 30 receives, via the communication unit 32, the notification transmitted from the information processing apparatus 20. Then, the control unit 31 of the terminal 30 outputs the received notification to the goods provision candidate for the flea market by display or voice via the output unit 35.

Step S107: The control unit 21 of the information processing apparatus 20 outputs an instruction to move the vehicle 10 positioned in the first area A1 to the second area A2 by autonomous driving or a dedicated vehicle.

First, a case where the vehicle 10 is autonomously driven will be specifically described. The control unit 21 of the information processing apparatus 20 generates an instruction to cause each vehicle 10 positioned in the first area A1 to move to the second area A2 by autonomous driving. Then, the control unit 21 transmits the generated instruction to each vehicle 10 via the communication unit 22. Then, the control unit 11 of each vehicle 10 receives the instruction from the information processing apparatus 20 via the communication unit 12. As such, each vehicle 10 is moved from the first area A1 to the second area A2 by autonomous driving. In this example, a process of step S107 is executed on a date of the event to be held.

Next, a case where the vehicle 10 is not autonomously driven will be specifically described. The control unit 21 of the information processing apparatus 20 generates an instruction to move each vehicle 10 positioned in the first area A1 to the second area A2 by towing or lifting transportation by a dedicated vehicle. Then, the control unit 21 transmits the generated instruction to any management terminal possessed by a manager of the parking lot P via the communication unit 22. Then, upon receiving the instruction from the information processing apparatus 20 via any communication interface, the management terminal outputs the content of the instruction to the manager of the parking lot P via any output interface by display or voice. Then, when the manager of the parking lot P arranges a dedicated vehicle on, for example, the date of the event to be held, each vehicle 10 positioned in the first area A1 can be moved to the second area A2 by towing or lifting transportation by the dedicated vehicle.

As described above, the control unit 21 of the information processing apparatus 20 according to the present embodiment determines, upon determining that the demand for parking in the parking lot P is low based on the comparison between the score indicating the demand for parking in the parking lot P and the predetermined first threshold value, to set the first area A1 which is at least a part of the parking lot P to the parking prohibited state.

With this configuration, when the demand for parking in the parking lot P is low, the first area A1 which is at least a part of the parking lot P is set to the parking prohibited state. For this reason, it is possible to utilize the first area A1 as an event venue or the like. Therefore, the technology that promotes the utilization of the parking lot P is improved.

Although the present disclosure has been described based on the drawings and the embodiment, it should be noted that those skilled in the art may make variations and modifications based on the present disclosure. Therefore, it should also be noted that these variations and modifications fall within the scope of the present disclosure. For example, functions and the like, included in each element, each step, or the like, can be rearranged so as not to be logically contradictory, and a plurality of elements, steps, or the like, may be combined into one or divided.

For example, as a first modified example, the control unit 21 of the information processing apparatus 20 may register in advance one or more business owners for each candidate event. Then, the control unit 21 may output a notification asking the business owners associated with the event selected in step S104 to open booths. In this modified example, it is assumed that the candidate events are a gourmet food festival, a live concert, and a Bon dance festival, and the gourmet food festival is selected in the same manner as in step S104 described above. In this case, one or more restaurants are registered in advance for the gourmet food festival in the storage unit 23 of the information processing apparatus 20, one or more entertainment offices are registered in advance for the live concert, and a residents' association or a neighborhood association is registered in advance for the Bon dance festival. Then, the control unit 21 outputs, via the communication unit 22, a notification asking one or more restaurants associated with the gourmet food festival that is selected in the same manner as in step S104 to open booths. Upon receiving, via the communication unit 22, a notification indicating a desire to open booths from one or more restaurants, the control unit 21 may determine to hold an event.

For example, as a second modified example, in a situation where the vehicle 10 has been moved from the first area A1 in the parking prohibited state to the second area A2 in the parking permitted state, when a cost of returning the vehicle 10 to the first area A1 after an end of the event is lower than a predetermined fourth threshold value, the control unit 21 of the information processing apparatus 20 may determine to return the vehicle 10 to the first area A1. The predetermined fourth threshold value may be appropriately set based on the total movement distance or working time when the vehicle 10 positioned in the second area A2 is moved to the first area A1.

For example, an embodiment in which a general-purpose computer functions as the information processing apparatus 20 according to the above-described embodiment is also possible. Specifically, a program describing processing contents that implement each function of the information processing apparatus 20 according to the above-described embodiment is stored in the memory of a general-purpose computer, and the program is read and executed by a processor. Therefore, the disclosure according to the present embodiment can also be implemented as a program that can be executed by a processor or a non-transitory computer-readable medium storing the program.

What is claimed is:

1. An information processing apparatus comprising:
  a processor, and
  a memory storing a program that causes the processor to:
    compare a score indicating a demand for parking in a parking lot with a predetermined first threshold value;
    determine whether the demand for parking in the parking lot is low based on the comparison;
    set, when the demand for parking in the parking lot is determined to be low based on the comparison, a first area to a parking prohibited state, the first area being a part of the parking lot;
    control a light source embedded in a road surface of the parking lot to indicate the first area and a second area on the road surface of the parking lot in a manner in which they are distinguishable, the second area being an area of the parking lot which is not set to the parking prohibited state;
    register event information for each of a plurality of candidate events, the event information including a minimum size of an area required for each of the candidate events to be held;
acquire a popularity rank of each of the candidate events from a plurality of first users; and
select, based on the registered minimum size and the acquired popularity rank, a most popular event from among first events out of the candidate events, the minimum size of the first events being smaller than a size of the first area.

2. The information processing apparatus according to claim 1, further comprising a communication unit, wherein
the program further causes the processor to transmit an instruction to the communication unit of a vehicle positioned in the first area, the transmitted instruction causing the vehicle to autonomously drive to the second area.

3. The information processing apparatus according to claim 1, wherein the program further causes the processor to:
calculate a cost based on a total movement distance or working time when a vehicle positioned in the first area is moved to the second area; and
to set the first area to the parking prohibited state when the cost is lower than a predetermined second threshold value.

4. The information processing apparatus according to claim 3, wherein the program further causes the processor to calculate a profit expected from an event to be held in the first area, and the predetermined second threshold is set based on the calculated profit.

5. The information processing apparatus according to claim 1, wherein the program further causes the processor to:
acquire the number of expected participants for each of the candidate events; and
adjust, based on the acquired number of expected participants, the minimum size registered in advance.

6. The information processing apparatus according to claim 1, wherein the program further causes the processor to:
register in advance one or more business owners for each of the candidate events; and
output a notification asking the business owners associated with the selected event to open booths.

7. The information processing apparatus according to claim 1, wherein:
an event held in the first area is a flea market; and
the program further causes the processor to select a goods provision candidate for the flea market based on goods provision information of each of second users of an application or a service that enables the second users to buy and sell goods between the second users, the goods provision information of each of the second users being provided in the application or the service.

8. The information processing apparatus according to claim 1, further comprising a communication unit, wherein:
the program further causes the processor to transmit, via the communication unit, a questionnaire to a terminal of each of the first users, and receive, via the communication unit, an answer of each of the first users to the questionnaire; and
the popularity rank is based on the answer of each of the first users.

9. The information processing apparatus according to claim 8, wherein the program further causes the processor to adjust the minimum size of the area based on the number of the first users that responds the questionnaire.

10. A method executed by an information processing apparatus, the method comprising:
comparing a score indicating a demand for parking in a parking lot with a predetermined first threshold value;
determining whether the demand for parking in the parking lot is low based on the comparison;
setting, when the demand for parking in the parking lot is determined to be low based on the comparison, a first area to a parking prohibited state, the first area being a part of the parking lot;
controlling a light source embedded in a road surface of the parking lot to indicate the first area and a second area on the road surface of the parking lot in a manner in which they are distinguishable, the second area being an area of the parking lot which is not set to the parking prohibited state;
registering event information for each of a plurality of candidate events, the event information including a minimum size of an area required for each of the candidate events to be held;
acquiring a popularity rank of each of the candidate events from a plurality of first users; and
selecting, based on the registered minimum size and the acquired popularity rank, a most popular event from among first events out of the candidate events, the minimum size of the first events being smaller than a size of the first area.

11. The method according to claim 10, wherein the information processing apparatus includes a communication unit, and the method further comprises:
transmitting an instruction to the communication unit of a vehicle positioned in the first area, the transmitted instruction causing the vehicle to autonomously drive to the second area.

12. The method according to claim 10, further comprising:
calculating a cost based on a total movement distance or working time when a vehicle positioned in the first area is moved to the second area; and
setting the first area to the parking prohibited state when the cost is lower than a predetermined second threshold value.

13. The method according to claim 10, further comprising:
acquiring the number of expected participants for each of the candidate events; and
adjusting, based on the acquired number of expected participants, the minimum size registered in advance.

14. The method according to claim 10, further comprising:
registering in advance one or more business owners for each of the candidate events; and
outputting a notification asking the business owners associated with the selected event to open booths.

15. The method according to claim 10, wherein:
an event held in the first area is a flea market; and the method further comprises:
selecting a goods provision candidate for the flea market based on goods provision information of each of second users of an application or a service that enables the second users to buy and sell goods between the second users, the goods provision information of each of the second users being provided in the application or the service.

16. A non-transitory storage medium storing a command to cause a computer to execute functions comprising:
- comparing a score indicating a demand for parking in a parking lot with a predetermined first threshold value;
- determining whether the demand for parking in the parking lot is low based on the comparison;
- setting, when the demand for parking in the parking lot is determined to be low based on the comparison, a first area to a parking prohibited state, the first area being a part of the parking lot;
- controlling a light source embedded in a road surface of the parking lot to indicate the first area and a second area on the road surface of the parking lot in a manner in which they are distinguishable, the second area being an area of the parking lot which is not set to the parking prohibited state;
- registering event information for each of a plurality of candidate events, the event information including a minimum size of an area required for each of the candidate events to be held;
- acquiring a popularity rank of each of the candidate events from a plurality of first users; and
- selecting, based on the registered minimum size and the acquired popularity rank, a most popular event from among first events out of the candidate events, the minimum size of the first events being smaller than a size of the first area.

17. The non-transitory storage medium according to claim 16, wherein the functions further comprise transmitting an instruction to the communication unit of a vehicle positioned in the first area, the transmitted instruction causing the vehicle to autonomously drive to the second area.

18. The non-transitory storage medium according to claim 16, wherein:
- the functions further comprise
  - calculating a cost based on a total movement distance or working time when a vehicle positioned in the first area is moved to the second area; and
  - setting the first area to the parking prohibited state when the cost is lower than a predetermined second threshold value.

19. The non-transitory storage medium according to claim 16, wherein the functions further comprise:
- registering in advance one or more business owners for each of the candidate events; and
- outputting a notification asking the business owners associated with the selected event to open booths.

* * * * *